US012651153B2

(12) United States Patent　　　　　(10) Patent No.: US 12,651,153 B2
Copty et al.　　　　　　　　　　　　　　(45) Date of Patent:　　　　Jun. 9, 2026

(54) ADVERSIAL DEEP NEURAL NETWORK FUZZING

(71) Applicant: International Business Machines Corporation, Armonk, NY (US)

(72) Inventors: Fady Copty, Haifa (IL); Dov Murik, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1287 days.

(21) Appl. No.: 16/163,611

(22) Filed: Oct. 18, 2018

(65) Prior Publication Data

US 2020/0125943 A1　　Apr. 23, 2020

(51) Int. Cl.
　　*G06N 3/08*　　　　(2023.01)
　　*G06F 21/57*　　　(2013.01)
　　*G06N 3/043*　　　(2023.01)

(52) U.S. Cl.
　　CPC ............. *G06N 3/08* (2013.01); *G06F 21/577* (2013.01); *G06N 3/043* (2023.01); *G06F 2221/034* (2013.01)

(58) Field of Classification Search
　　CPC .......... G06N 3/08; G06N 3/043; G06N 20/00; G06N 3/0445; G06N 3/0454; G06N 5/003; G06N 20/20; G06N 7/005; G06N 3/084; G06N 3/088; G06N 20/10; G06N 3/0472; G06N 3/04; G06N 5/025; G06N 5/022; G06N 5/048; G06N 3/006; G06N 3/126; G06N 5/04; G06N 3/0481; G06N 3/10; G06N 5/046; G06N 3/0418; G06N 3/0436; G06N 3/086; G06N 5/02; G06N 5/045; G06N 7/023; G06N 7/046; G06N 3/049; G06N 3/063; G06N 3/082; G06F 21/577; G06F 2221/034
See application file for complete search history.

(56) References Cited

U.S. PATENT DOCUMENTS 7,926,114 B2　　4/2011　Neystadt et al.
8,417,998 B2　　4/2013　Thomas et al.
(Continued)

FOREIGN PATENT DOCUMENTS

WO　　　2017181286　　　10/2017

OTHER PUBLICATIONS

Grosse et al., Adversarial Examples for Malware Detection, 2017 (Year: 2017).*
(Continued)

*Primary Examiner* — James Trujillo
(74) *Attorney, Agent, or Firm* — Scott Dobson

(57)　　　　　ABSTRACT

A method for detecting security vulnerabilities, comprising: generating a corpus of input samples each labeled to indicate a threat level when executed by an input processing code; training a neural network (NN) using the plurality of input samples to classify inputs according to a plurality of labels of the plurality of input samples; for each input sample: iteratively altering the input sample to correspond to a process of gradient change of the NN, until the NN classifies the altered input sample to a different label than a respective label of the input sample; assigning the different label to the altered input sample; using the plurality of relabeled altered input samples to further train the NN and augment the corpus of input samples.

13 Claims, 8 Drawing Sheets

(56)             References Cited

U.S. PATENT DOCUMENTS

| | | | |
|---|---|---|---|
| 9,118,713 | B2 | 8/2015 | Bisht et al. |
| 9,160,762 | B2 | 10/2015 | Brake et al. |
| 10,366,233 | B1 * | 7/2019 | Feinman .................. G06N 5/01 |
| 2018/0005136 | A1 | 1/2018 | Gai et al. |
| 2018/0107821 | A1 | 4/2018 | Eshkenazi et al. |

OTHER PUBLICATIONS

Stevens et al., Summoning Demons, The Pursuit of Exploitable Bugs in Machine Learning, 2017 (Year: 2017).*
Nichols et al., Faster Fuzzing: Reinitialization with Deep Neural Models, 2017 (Year: 2017).*
Pei et al., DeepXplore: Automated Whitebox Testing of Deep Learning Systems, Oct. 14, 2017 (Year: 2017).*
Dering et al., Generative Adversarial Networks for Increasing the Veracity of Big Data, 2017, 2017 IEEE International Conference on Big Data (BIGDATA), pp. 2595-2602 (Year: 2017).*
Yadav et al., Stabilizing Adversarial Nets With Prediction Methods, 2018 (Year: 2018).*
Rajpal et al., Not all bytes are equal: Neural byte sieve for fuzzing, 2017 (Year: 2017).*
Goodfellow et al., Deep Learning, 2016, MIT Press, Chapter 6, p. 200 (Year: 2016).*
Gardiner et al., On the Security of Machine Learning in Malware C&C Detection: A Survey, 2016 (Year: 2016).*
Nicole Nichols et al., "Faster Fuzzing: Reinitialization with Deep Neural Model", arXiv, Nov. 8, 2017.
William Blum, "Neural fuzzing: applying DNN to software security testing", Microsoft Research Blog, Nov. 13, 2017.
Xiaoyong Yuan et al., "Adversarial examples: attacks and defenses for deep learning", arXiv, Jan. 5, 2018.
Konstantin Bottinger et al., "Deep Reinforcement Fuzzing", arXiv, Jan. 14, 2018.
Mohit Rajpal et al., "Not all bytes are equal: Neural byte sieve for fuzzing", Nov. 10, 2017.
Antreas Antoniou et al., "Data Augmentation Generative Adversarial Networks", arXiv, Mar. 21, 2018.

* cited by examiner

```
ORIGINAL BENIGN TEST                                    —— 700

<!DOCTYPE doc [

<!ELEMENT doc (norm+)>

<!ELEMENT norm EMPTY>

<!ATTLIST norm attr NMTOKENS #IMPLIED>
]>
<doc>

<norm attr = '="<" foo bar
'/>

<norm attr = 'f="<"oobar
'/>

<norm attr = 'foo                 bar      '/>

<norm attr = ' foo &=" encoding=\"1\""
```

```
ADVERSARIAL ALTERED TEST                                —— 702

<!DOCTYPE doc [

<!ELEMENT doc (norm+)>

<!ELEMENT norm EMPTY>

<!ATTLIST norm attr NMTOKENS #IMPLIED>
]>
<doc>

<norm attr<&<"<:"eno aaq
'/=

=npsl_uto;!%d: &lu;"poaar           &/=  ;morl atsq<&foo        b`&.=
;moqm`ttr < 'eno &<"dnbp_dorHS7a$
```

```
ADVERSARIAL ALTERED TEST CLASSIFIED AS MALICIOUS        —— 704

<!DOCTYPE doc [

<!ELEMENT doc (norm+)>

<!ELEMENT norm EMPTY>
; @SSKISSnorl atsqNLTNJDMS "HLOLIEC>         ]=       ;doc=

<mnqm`stq<&<"<:"eno aaq
'/=

=npsl_uto;!$d9%lu;"qo`r

&/=  ;morl atsq<&foo          b`&.=
;moqm`ttr < 'eno &<! enao_emrJ[.f
```

FIG. 7

800 — TEST GENERATION USING AFL FUZZ TESTING

802 — AFL APPLIED FOR 18 CYCLES

804 — 4000 TESTS AS CORPUS OF TESTS

806 — DNN FUZZING BY GRADIENT ASCENT

808 — 30 UNIQUE PATH TESTS

ADVERSIAL DEEP NEURAL NETWORK FUZZING

BACKGROUND

The present invention, in some embodiments thereof, relates to testing of software and/or firmware vulnerabilities and, more specifically, but not exclusively, to testing code security vulnerabilities.

The problem of finding security vulnerabilities in input-processing code has been a challenge for the testing and security communities. Several factors contribute to the importance and difficulty of the problem. For one, discovering security vulnerabilities in an application is the first step in creating an attack that exploits the application's vulnerability. Secondly, finding, fixing, and patching vulnerabilities consist of a great cost and effort. In order to reduce the costs of discovering security vulnerabilities, companies are known to run bug bounty programs in which ethical hackers attempt to find vulnerabilities in various computer codes.

In addition to using ethical hacking, companies employ various techniques for creating tests for a system under test (SUT) by using user provided templates. One technique comprises concolic and symbolic interpreter testing, which tests the SUT using model checking techniques. Another family of techniques comprises genetic fuzzing, in which a genetic algorithm is used to create tests based on given tests and possibly a dictionary.

While generation based testing has proven to be limited by human error and concolic testing is not a scalable technique, genetic fuzzing has become the state of the art security testing. American Fuzzy Lop (AFL) is the main tool used in this domain. However, Genetic fuzzing is limited by the initial tests provided, the dictionary provided, and is prone to getting stuck in local minima and being unable to generate tests outside its limited scope. In order to overcome these problems, enhancements to genetic fuzzing using artificial intelligence (AI) techniques have been proposed.

SUMMARY

It is an object of some embodiments of the present invention to provide a system and a method for adversarial deep neural network fuzzing.

The foregoing and other objects are achieved by the features of the independent claims. Further implementation forms are apparent from the dependent claims, the description and the figures.

According to a first aspect of the invention, a method for detecting security vulnerabilities, comprising: generating a corpus of input samples each labeled to indicate a threat level when executed by an input processing code; training a neural network (NN) using the plurality of input samples to classify inputs according to a plurality of labels of the plurality of input samples; for each input sample: iteratively altering the input sample to correspond to a process of gradient change of the NN, until the NN classifies the altered input sample to a different label than a respective label of the input sample; assigning the different label to the altered input sample; using the plurality of relabeled altered input samples to further train the NN and augment the corpus of input samples.

According to a second aspect of the invention, a system for detecting security vulnerabilities, comprising: at least one processor adapted to execute a code for: generating a corpus of input samples each labeled to indicate a threat level when executed by an input processing code; training a neural network (NN) using the plurality of input samples to classify inputs according to a plurality of labels of the plurality of input samples; for each input sample: iteratively altering the input sample to correspond to a process of gradient change of the NN, until the NN classifies the altered input sample to a different label than a respective label of the input sample; assigning the different label to the altered input sample; using the plurality of relabeled altered input samples to further train the NN and augment the corpus of input samples.

With reference to the first and second aspects, in a first possible implementation of the first and second aspects of the present invention, optionally, each of the plurality of labels is a benign label, an error label, or a malicious label.

With reference to the first and second aspects, or the first implementation of the first and second aspects, in a second possible implementation of the first and second aspects of the present invention, optionally, the threat level indicated by the benign label corresponds to a benign effect produced by processing a respective input sample by the input processing code, wherein the threat level indicated by the error label corresponds to an error effect produced by processing a respective input sample by the input processing code; wherein the threat level indicated by the malicious label corresponds to a malicious effect produced by processing a respective input sample by the input processing code.

With reference to the first and second aspects, or the first or second implementations of the first and second aspects, in a third possible implementation of the first and second aspects of the present invention, optionally, generating the corpus of input samples is based on a fuzzing algorithm.

With reference to the first and second aspects, or the first, second, or third implementations of the first and second aspects, in a fourth possible implementation of the first and second aspects of the present invention, optionally, generating the corpus of input samples is based on a fuzzing algorithm from a group consisting of: generation based fuzzing of the input samples; genetic fuzzing of the input samples; concolic testing of the input samples; labeling each of the input samples according to the threat level.

With reference to the first and second aspects, or the first, second, third, or fourth implementations of the first and second aspects, in a fifth possible implementation of the first and second aspects of the present invention, optionally, extracting a plurality of features from internal layers of the NN, creating a dictionary based on the plurality of features, and using the dictionary for embedding dictionary entries within the corpus of input samples.

With reference to the first and second aspects, or the first, second, third, fourth, or fifth implementations of the first and second aspects, in a sixth possible implementation of the first and second aspects of the present invention, optionally, augmenting the corpus of input samples as follows: for each input sample of the corpus of input samples, iteratively alternating between: altering the input sample by the process of gradient change of the NN; and altering the input sample by the fuzzing algorithm.

With reference to the first and second aspects, or the first, second, third, fourth, fifth, or sixth implementations of the first and second aspects, in a seventh possible implementation of the first and second aspects of the present invention, optionally, training the NN using the plurality of input samples and respective feature extraction data obtained during processing the plurality of input samples by the fuzzing algorithm.

With reference to the first and second aspects, or the first, second, third, fourth, fifth, sixth, or seventh implementations of the first and second aspects, in an eighth possible implementation of the first and second aspects of the present invention, optionally, discarding a plurality of relabeled altered input samples which do not trigger unique execution paths when processed by the input processing code.

With reference to the first and second aspects, or the first, second, third, fourth, fifth, sixth, seventh or eighth implementations of the first and second aspects, in a ninth possible implementation of the first and second aspects of the present invention, optionally, an amount of iterations applied for the gradient change of the NN on altered input samples of a plurality of altered input samples is equal to an amount of iterations needed until a respective internal layer of the NN reaches a state of maximal activation.

With reference to the first and second aspects, or the first, second, third, fourth, fifth, sixth, seventh, eighth or ninth implementations of the first and second aspects, in a tenth possible implementation of the first and second aspects of the present invention, optionally, during iteratively altering each input sample: performing a plurality of intermediate alterations of the input sample; and incorporating the plurality of intermediate alterations into the corpus of input samples.

With reference to the first and second aspects, or the first, second, third, fourth, fifth, sixth, seventh, eighth, ninth or tenth implementations of the first and second aspects, in an eleventh possible implementation of the first and second aspects of the present invention, optionally, the NN alters the plurality of input samples to allow the NN to classify each input sample of the plurality of input samples to a respective label which corresponds to a predetermined mapping between labels of the plurality of labels.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 7 is an exemplary depiction a result of altering an extensible markup language (XML) code, according to some embodiments of the present invention.

DETAILED DESCRIPTION

Figure 1:
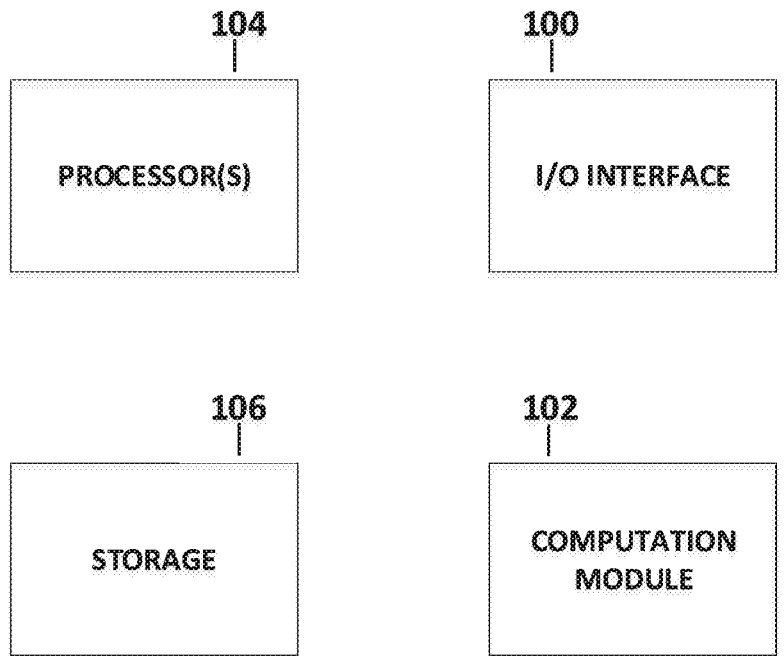
FIG. 1 is an exemplary layout of the various components of a system of some embodiments of the present invention.

The present invention, in some embodiments thereof, relates to code security vulnerabilities and, more specifically, but not exclusively, to testing code security vulnerabilities.

According to some embodiments of the present invention there are provided fuzz testing systems and methods in which processes produce inputs for input processing codes for testing and/or discovering security vulnerabilities in the input processing codes.

According to some embodiments of the present invention there is provided a system which applies to fuzz testing and a method of detecting security vulnerabilities in input processing code by generating adversarial input samples by using a neural network. Hereby, 'input samples' are also known as 'tests', and 'fuzz testing' is also known as 'fuzzing'.

According some embodiments of the present invention, there is provided a method for generating adversarial tests from a corpus of tests, and several extensions. The method for generating adversarial tests is based on a process of gradient change of a neural network. Optionally, the gradient change process is a gradient ascent process or a gradient descent process. As used herein a gradient ascent process is applied on a neural network (NN) such as a deep neural network (DNN). The NN comprises a plurality of layers. Optionally, a corpus of tests is given or generated by generation based methods, such as concolic testing wherein tests are generated by logically following execution paths. Optionally, each test is labeled according to a threat level produced when inputted into a given input processing code, hereby also known as the system under test (SUT). Optionally, the effect may be one of: benign, error, and malicious. Optionally, the corpus of tests may be further expanded using fuzzing methods such as genetic fuzzing.

Optionally, the DNN is trained to classify tests in the corpus of tests according to their respective test labels. Optionally, each test in the corpus of tests is inputted into the DNN, and by an iterative gradient ascent process which includes backpropagation, each test is altered according to a respective error until it is classified by the DNN to a different label than its label. Optionally, each test is relabeled accordingly by inputting each test into the SUT and observing a respective effect. Optionally, the relabeled tests are included in the corpus of tests, and are used to further train the DNN.

Several extensions are described, which have the purpose of increasing efficiency in generating unique and significant adversarial tests for the SUT, by augmenting the corpus of tests in various ways.

According to some embodiments of the present invention, a dictionary is created, based on a plurality of features that may be extracted from internal layers of the DNN. These may include, for example, various strings and tokens which may have significance regarding security vulnerabilities of the SUT. Optionally, the dictionary entries include code samples which are embedded in tests of the corpus of tests for further generating adversarial tests using methods such as genetic fuzzing.

Optionally, the corpus of tests is augmented by an iterative process which alters tests by alternating between the method of gradient ascent applied in small steps, and the fuzzing algorithm. The combination of the two may produce novel adversarial tests which are not producible by either separately.

Optionally, the DNN is trained by incorporating in addition to the label of each test, data derived from the internals of the fuzzing algorithm, for example a dataset used by genetic fuzzing may include in its internals certain features related to the plurality of tests which may be used to train the DNN.

Optionally, only tests which trigger unique execution paths when processed by the SUT are incorporated into the corpus of tests, in order to use only produced tests which are uniquely significant regarding security vulnerabilities of the SUT.

Optionally, each test is altered by applying the method of gradient ascent until an internal layer of the DNN reaches a state of maximal activation.

Optionally, intermediate alterations of tests are stored during the process of applying the method of gradient ascent, in order to augment the corpus of tests.

Optionally, a mapping between labels of the plurality of labels is employed, such that the method of gradient ascent is constrained to follow paths which transform tests of a given label to be classified to a respective label according to the mapping, which may generate unique adversarial tests.

Experiments using the DNN resulted in significant enhancement to American fuzzy lop (AFL), and in comparison to some embodiments of the present invention, the following alternative solutions to fuzzing using neural networks exhibit poorer performance and none report using adversarial generating NN techniques. Reference is now made to "Faster Fuzzing: Reinitialization with Deep Neural Models" by N. Nichols, M. Raugas, R. Jasper, and N. Hilliard. Published at arXiv:1711.02807 on Nov. 8, 2017, in which a Generative Adversary Network (GAN) training is described in order to generate new tests for AFL. It is reported that a 4-11% improvement only over random AFL fuzzing is achieved.

In "Deep Reinforcement Fuzzing" by K. Bottinger, P. Godefroid, and R. Singh. Published at arXiv:1801.04589 on Jan. 14, 2018, a fuzz testing is described as a game and by using Q-learning techniques. As for the previous alternative solution, performance is claimed to be better than random AFL fuzzing, however random AFL fuzzing displays significantly worse performance than standard AFL.

In "Not all bytes are equal: Neural byte sieve for fuzzing" by M. Rajpal, W. Blum, and R. Singh. Published at arXiv:

1711.04596 on Nov. 10, 2017, a learning method is described for a genetic algorithm to decide upon a mutation location within a test. The learning method improves time complexity but is unable to overcome the local minima problem.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a depiction of system components in a fuzzing system according to some embodiments of the present invention. The system is used for generating adversarial tests for the SUT, which may have malicious effects. For example, an embodiment of the system may be a cloud service, which receives as input an SUT as code, and returns a report detailing adversarial tests which discovered security vulnerabilities of the SUT.

The system includes an I/O interface 100 which may receive an SUT to be tested, and an optional initial corpus of tests for the SUT, and may output upon request, a list of adversarial tests for the SUT. The system includes a computation module 102, which may be responsible for the functionality of the fuzzing process. The system includes at least one processor 104 which executes instructions originating in the computation module and storage 106 that stores data such as a DNN, the corpus of tests, intermediate tests, and simulation results. It is assumed that the various system components may be implemented as software and/or firmware.

Figure 2:
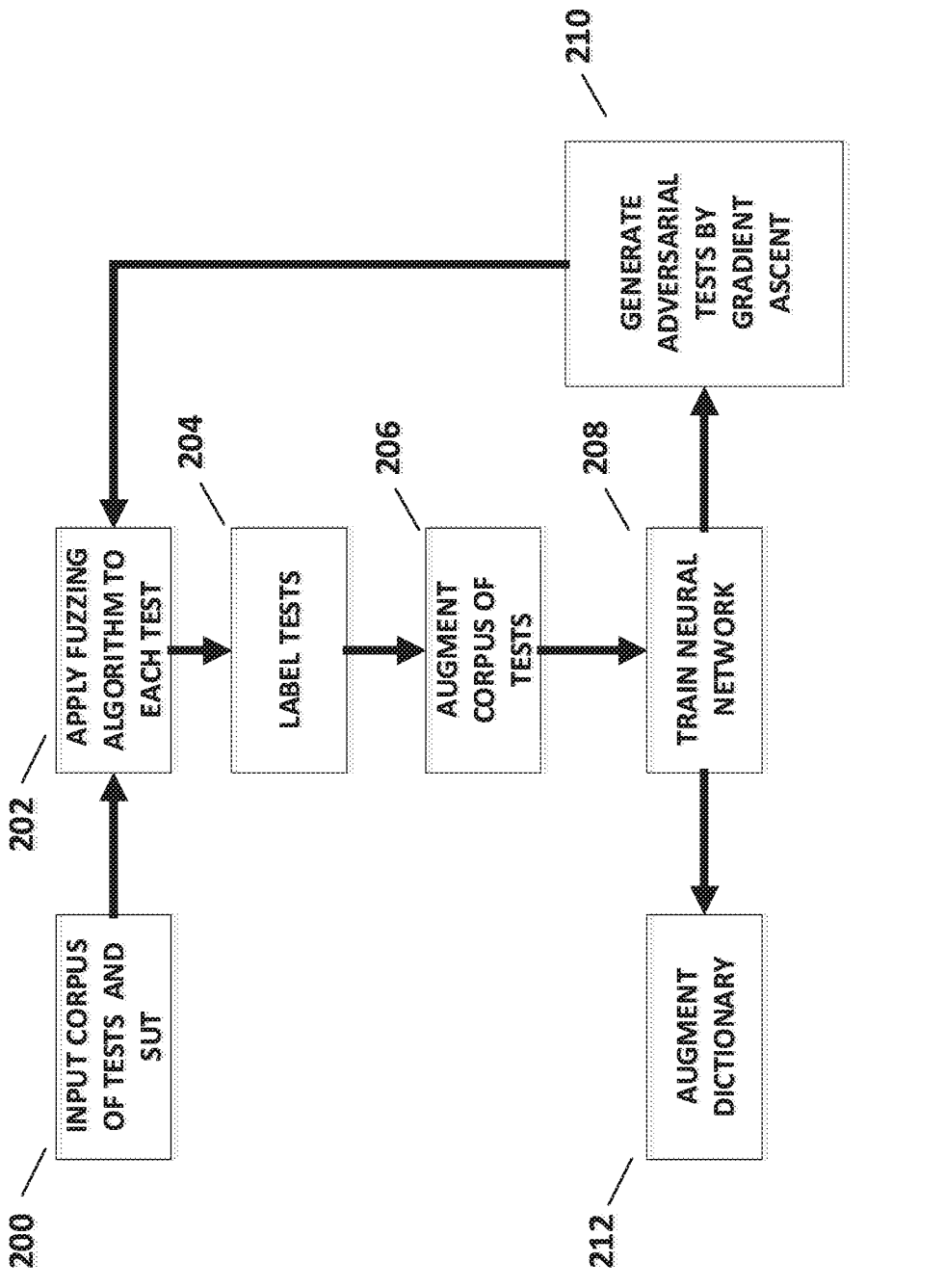
FIG. 2 is an exemplary dataflow of a method for generating adversarial tests by a DNN, according to some embodiments of the present invention.

Reference is also made to FIG. 2, which is a dataflow of a method of detecting security vulnerabilities which may be executed by the system 100, according to some embodiments of the present invention. First, as shown at 200, the input, for instance a corpus of tests and an SUT, is inputted, accessed, or otherwise received, for example, through an I/O interface or by access to a storage.

Now, as shown in 202, the method described applies the fuzzing algorithm to each test, for example, by using AFL, or a combination of genetic fuzzing and concolic testing, in order to randomly vary the distribution of the tests in the corpus of tests, which may be beneficial in discovering unique adversarial tests for the SUT. Optionally, each output resulting from the fuzzing is labeled according to an effect the test produces on the SUT. The labeling, which may be one of: benign, error, and malicious, may be performed by the method described by inputting each test in the corpus of tests into the SUT, observing an effect, and labeling the tests accordingly.

Next, as shown as 206, the corpus of tests may be augmented by the outcome of the fuzzing. According to some embodiments of the present invention, the corpus of tests is augmented by only adding tests that trigger unique execution paths when processed by the SUT, since it may be the case that only unique execution paths within the SUT are related to significantly undiscovered security vulnerabilities of the SUT.

Next, as seen at 208, the DNN may be trained using the corpus of tests to classify each test according to a respective label, and as shown at 210, adversarial tests may be generated by the process of gradient ascent from at least some of the tests of the corpus of tests, and the generated adversarial tests may be further used as inputs at 202.

Optionally, as shown in 212, after training the DNN, a dictionary is augmented with information obtained by a process of feature extraction from the DNN. According to some embodiments of the present invention, an output of an internal layer of the DNN may be used to produce a token and/or string related to features of the SUT which are encoded by the DNN, by using backpropagation by gradient ascent in a similar manner as depicted in 302, whereas the string and/or token may be related to security vulnerabilities of the SUT, as learned features encoded in the DNN internal layers.

Figure 3:
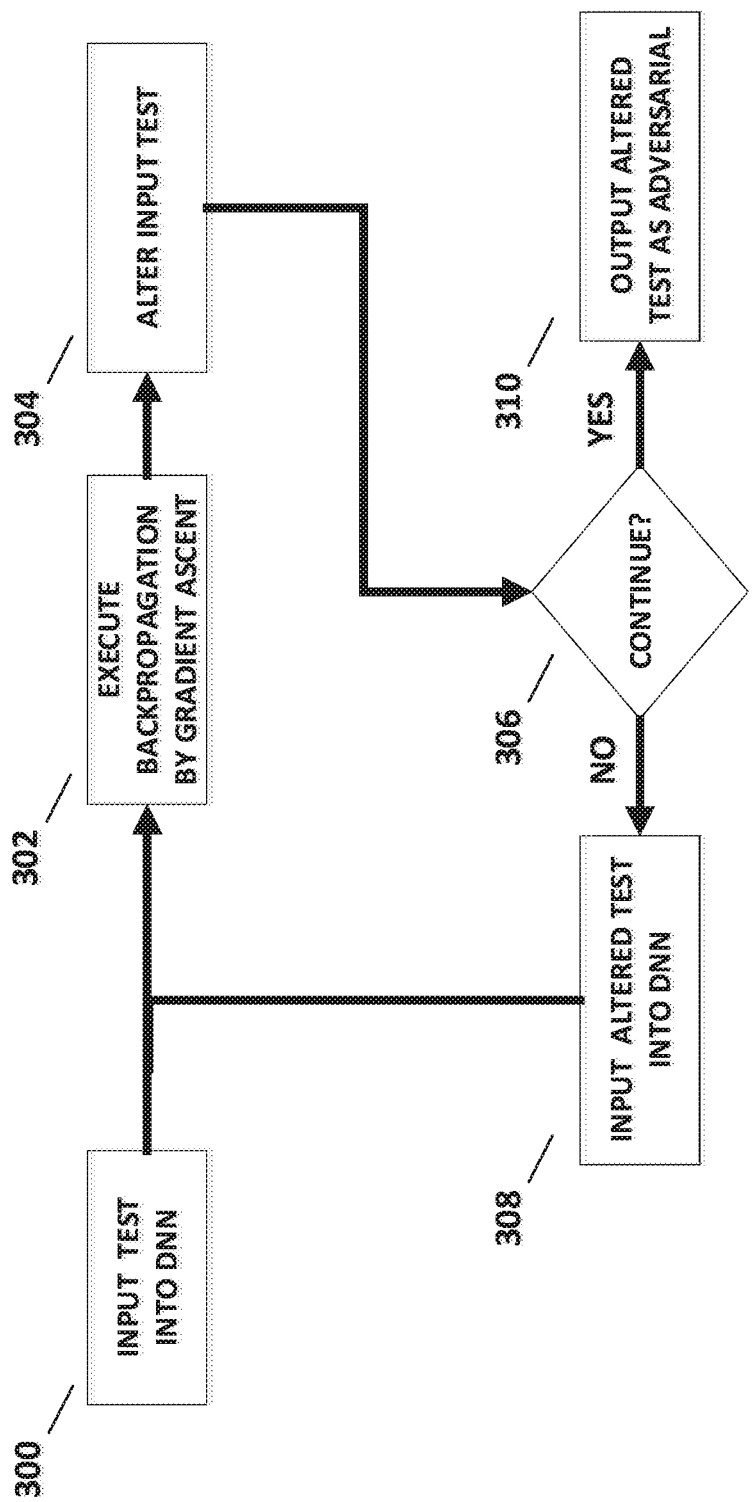
FIG. 3 is an exemplary dataflow of a method of generating adversarial tests by gradient ascent applied to the DNN, according to some embodiments of the present invention.

Reference is also made to FIG. 3, which depicts a dataflow of a process of generating adversarial tests by gradient ascent applied to the DNN, as mentioned at 210, according to some embodiments of the present invention. As shown at 300, a test may be inputted into the DNN. Next referenced is 302, wherein a method of backpropagation by gradient ascent may be executed on the DNN, by using the DNN output and producing an alteration value which by a process of iterative backpropagation reaches a DNN input layer. Next, as shown in 304, the input test may be altered by adding the alteration value to the input test, resulting in an alteration of the input test. For example, the DNN's input is a numerical vector which represents the input test which is given as a string of characters. Adding the alteration value to the numerical vector results in a vector that when translated back to a string of characters, comprises an altered code. According to some embodiments of the present invention, the gradient ascent is constrained to follow paths which transform tests classified to a given label to be classified to a respective label according to a mapping between labels, for instance it may be desired to transform tests that produce errors by the SUT into tests that produce malicious effects, in order to discover unique security vulnerabilities of the SUT.

Next referenced at 306, a decision may be made whether to continue altering the test. Optionally, the decision is based on a threat level of the altered test on the SUT. For example, if the altered test was classified as benign, and the threat level of the altered test is observed to correspond to a malicious label then the decision may be to not continue altering the test. According to some embodiments of the present invention, the decision is to continue altering the test until a respective internal layer of the DNN reaches a state of maximal activation, since it may be the case that certain security vulnerabilities of the SUT are discoverable only by following the process of gradient ascent as furthest as possible. Optionally, as shown in 308, if it is decided to continue altering the test, the altered test is re-inputted into the DNN, and as shown in 310, if it is decided to not continue altering the test, the altered test is outputted as an adversarial test for the SUT.

Figure 4:
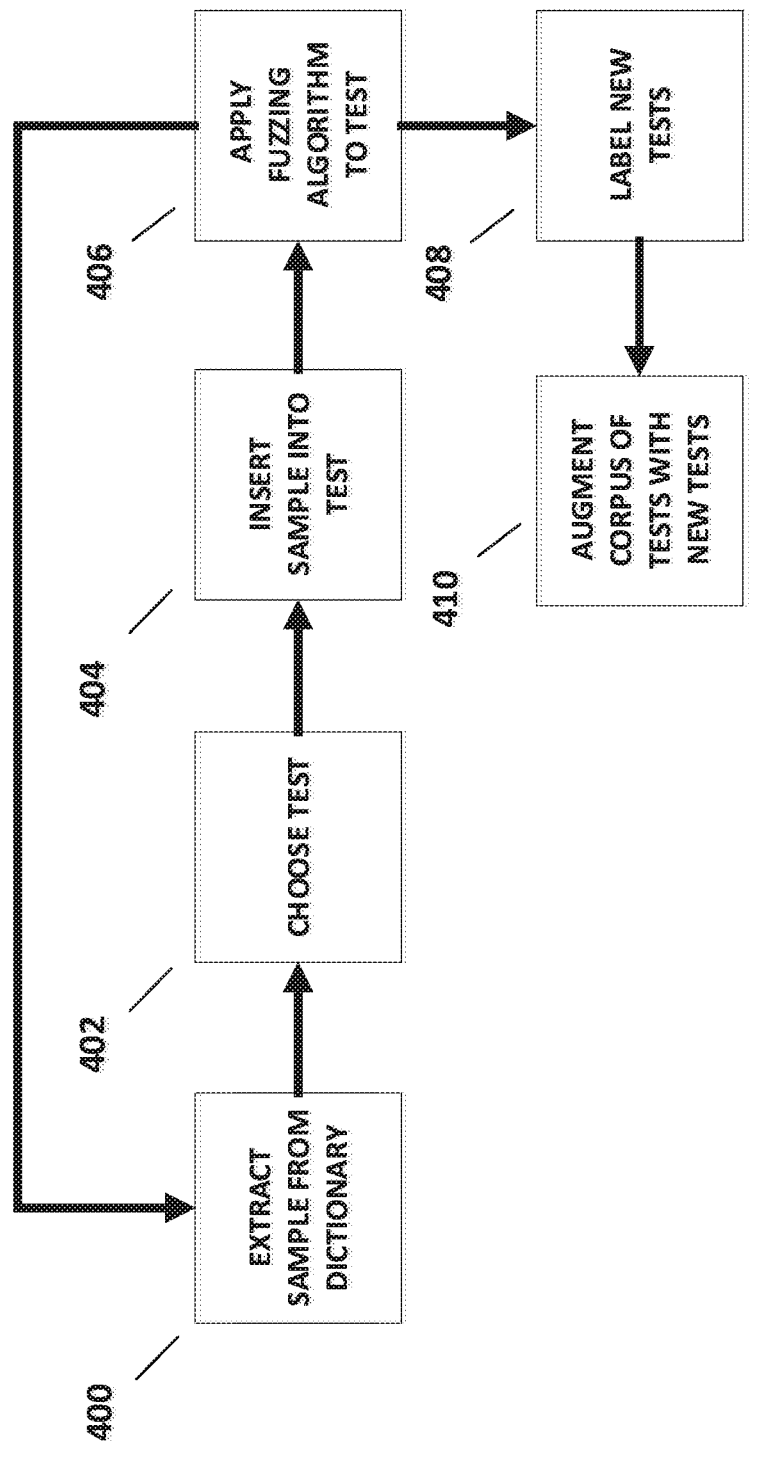
FIG. 4 is an exemplary dataflow for augmenting the corpus of tests by using a dictionary of feature extraction, according to some embodiments of the present invention.

Reference is now made to FIG. 4, which according to some embodiments of the present invention, depicts a process of augmenting the corpus of tests by using a dictionary of feature extraction data derived from internal layers of the DNN, as the internal layers of the DNN may encode by a process of learning significant features of tests related to security vulnerabilities of the SUT. Optionally, 400 is executed after 212, as depicted in FIG. 2. Optionally, as shown in 400, a sample is extracted from the dictionary. The sample may be extracted in a random manner. Next as shown at 402, a test from the corpus of test may be chosen. Optionally, the test is chosen in a random manner. As shown in 404, the sample may be inserted into the test. Optionally, a location within the test for inserting the sample is chosen randomly, or according to predetermined criteria. Optionally, as shown in 406, following insertion of the sample, a fuzzing method is applied to the test to produce new tests. Optionally, a new sample is extracted from the dictionary in

400, and the process is repeated until a predefined condition is met. Optionally, as shown in 408, the new tests are labeled by inputting each new test into the SUT, observing an effect within the SUT, and labeling each new test accordingly. Optionally, as shown in 410, the new tests are added to the corpus of tests.

Figure 5:
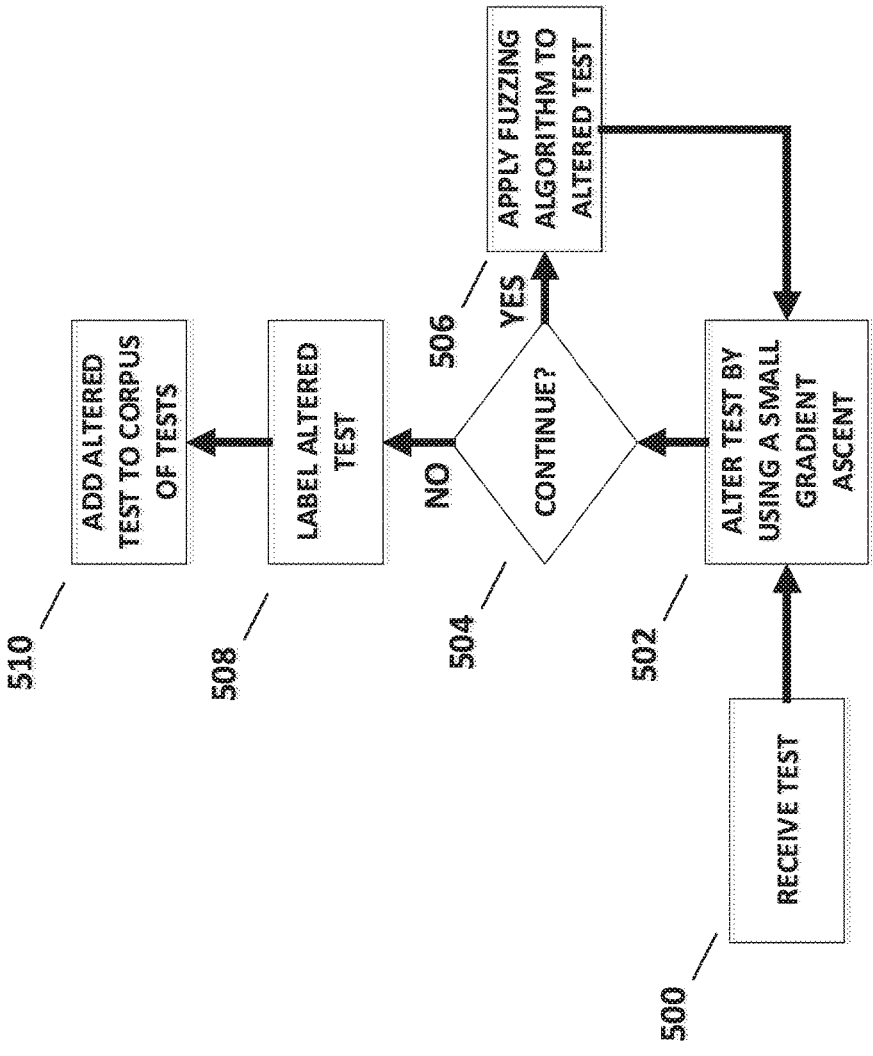
FIG. 5 is an exemplary dataflow for altering tests by iteratively alternating between altering tests by the method of gradient ascent applied to the DNN, and the fuzzing algorithm, according to some embodiments of the present invention.

Reference is now made to FIG. 5, which according to some embodiments of the present invention, depicts a process of altering tests by iteratively alternating between altering tests by the method of gradient ascent applied to the DNN, and the fuzzing algorithm. Optionally, the process is implemented during the process of generating adversarial tests by gradient ascent as depicted in FIG. 3. As shown in 500, a test may be inputted, and as shown in 502, the test may be altered by applying the method of gradient ascent applied to the DNN using a small gradient ascent, of which magnitude may be pre-determined. Optionally, as shown in 504, a decision is made as to whether to continue the alteration of the test. Optionally, the decision comprises criteria such as: following unique execution paths of the SUT, and/or reaching a maximal activation of internal layers of the DNN. As shown in 506, if a decision to continue alteration of the test is made, then the fuzzing algorithm may be applied to the altered test, followed by 504. As shown in 508, if a decision to cease alteration of the test is made, then the altered test may be labeled by inputting the altered test into the SUT, observing an effect, and labeling the altered test accordingly. As shown in 510, the altered test may be added to the corpus of tests. Optionally, the enhancement as depicted in FIG. 5 is repeated as often as deemed useful for tests in the corpus of tests, in order to generate new adversarial tests.

Figure 6:
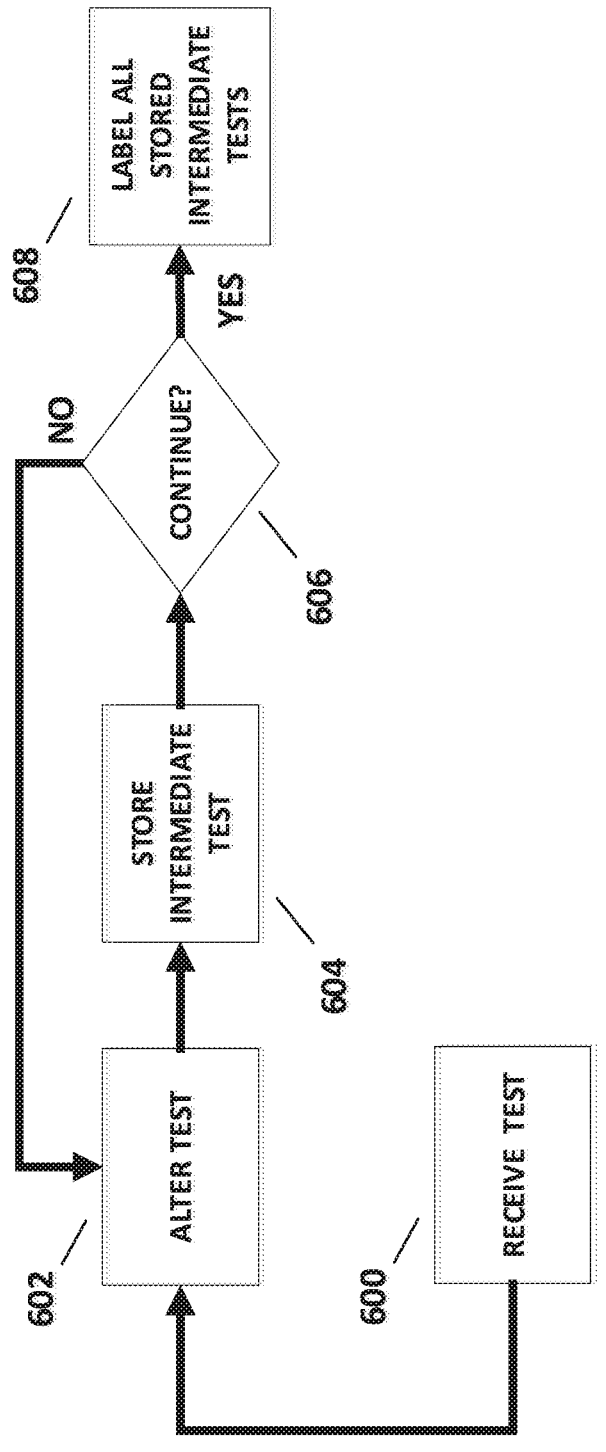
FIG. 6 is an exemplary dataflow for discarding altered tests according to predetermined criteria, and using intermediate alterations of tests to augment the corpus of tests, according to some embodiments of the present invention.

Reference is next made to FIG. 6, which according to some embodiments of the present invention, depicts a process of using intermediate alterations of tests to augment the corpus of tests, as intermediate alterations may produce unique adversarial tests for some SUT's. As shown in 600, a test may be received. Optionally, as shown in 602, the test is altered according to one of the processes and/or algorithms described herein, such as the process of gradient ascent applied to the DNN. Next, as shown in 604, an intermediate test resulting from an intermediate alteration of the test may be stored, for instance by using the storage 106. Next, as shown in 606, a decision may be taken whether to continue altering the intermediate test. The decision may be dependent on quantity and/or quality of generated intermediate tests, for example, whether intermediate tests currently generated display any significant threats on the SUT. Optionally, as shown in 608, if it is decided not to continue altering the test, all stored intermediate tests are labeled by inputting the stored tests into the SUT, observing respective effects, and labeling each stored intermediate test accordingly.

Reference is also made to FIG. 7, which depicts an exemplary result of altering an extensible markup language (XML) code by an embodiment of the present invention. As shown in 700, an XML code is classified as benign. As shown in 702, the XML code is altered to produce and adversarial XML code, as seen in 702, alterations are to '<norm attr/>' XML attributes. Next referenced is 704, which shows alterations to the XML code for which the altered XML code is classified as malicious. As seen in 704, in addition to changes in '<norm attr/>' XML attributes, alterations were made to an <!ATTLIST norm attr> XML attribute. Alterations, as shown in FIG. 7, demonstrate that while alterations made by the method of generating adversarial tests by gradient ascent may appear to be random in nature, they may produce code which may be threatening to the SUT.

Figure 8:
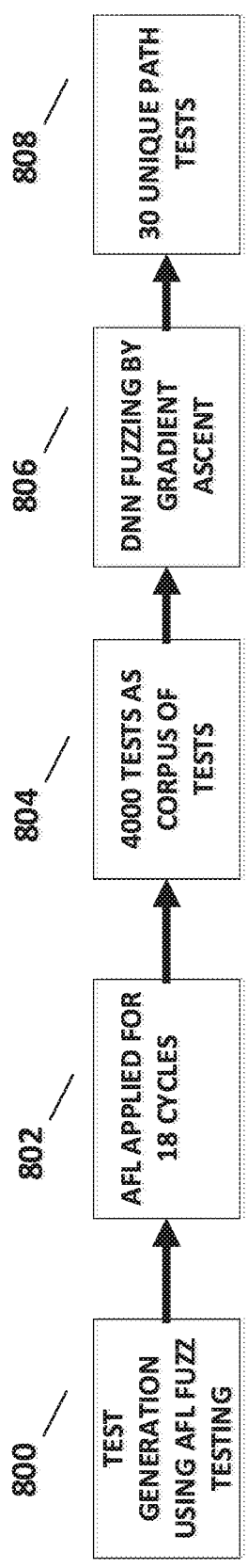
FIG. 8 is an exemplary depiction of results of simulations in conjunction with AFL, according to some embodiments of the present invention.

Reference is next made to FIG. 8, which depicts results of simulations of an embodiment of the present invention in conjunction with AFL. The results of simulations demonstrate that the method of gradient ascent applied to a DNN in a context of fuzzing may produce significant improvements over AFL. As shown in 800, AFL was used for generating tests, as shown in 802, AFL was applied to generated tests for approximately 40 hours which translated into 18 runtime cycles, indicative of a state of saturation, for which, as shown in 804, 4000 tests were produced to be used as the corpus of tests. Next, as shown in 806, the tests of the corpus of tests were inputted to an embodiment of the method of gradient ascent applied to a convolutional DNN, and as shown in 808, 30 unique execution path tests for an SUT were found.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term fuzzing is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for detecting security vulnerabilities, comprising:
   generating a corpus of a plurality of input samples each labeled to indicate a threat level when executed by an input processing code;
   training a neural network (NN) using the plurality of input samples to classify inputs according to a plurality of labels of the plurality of input samples;
   augmenting the corpus of input samples by, for each input sample:
      iteratively alternating between altering the input sample to correspond to a process of gradient change of the NN, and altering the input sample by a fuzzing algorithm until the NN classifies the altered input sample to a classification that is different from a respective label of the input sample before altering;

executing, after the NN classifies the altered input sample to a classification that is different from a respective label of the input sample, the altered input by the input processing code to observe an effect, wherein the input processing code is distinct from the NN; and
   assigning a new label to the altered input sample based on the observed effect of executing the altered input by the input processing code; and
using the plurality of labeled altered input samples to further train the NN.

2. The method of claim 1, wherein each of the plurality of labels is a benign label, an error label, or a malicious label.

3. The method of claim 2, wherein the threat level indicated by the benign label corresponds to a benign effect produced by processing a respective input sample by the input processing code,
   wherein the threat level indicated by the error label corresponds to an error effect produced by processing a respective input sample by the input processing code;
   wherein the threat level indicated by the malicious label corresponds to a malicious effect produced by processing a respective input sample by the input processing code.

4. The method of claim 1, wherein the fuzzing algorithm is selected from the group consisting of:
   generation based fuzzing of the input samples;
   genetic fuzzing of the input samples; and
   concolic testing of the input samples.

5. The method of claim 4, further comprising:
   extracting a plurality of features from internal layers of the NN;
   creating a dictionary based on the plurality of features; and
   using the dictionary for embedding dictionary entries within the corpus of input samples.

6. The method of claim 4, further comprising training the NN using the plurality of input samples and respective feature extraction data obtained during processing the plurality of input samples by the fuzzing algorithm.

7. The method of claim 1, further comprising discarding a plurality of labeled altered input samples which do not trigger unique execution paths when processed by the input processing code.

8. The method of claim 1, wherein an amount of iterations applied for the gradient change of the NN on altered input samples of a plurality of altered input samples is equal to an amount of iterations needed until a respective internal layer of the NN reaches a state of maximal activation.

9. The method of claim 1, further comprising, during iteratively altering each input sample:
   performing a plurality of intermediate alterations of the input sample; and
   incorporating the plurality of intermediate alterations into the corpus of input samples.

10. The method of claim 1 wherein an output of an internal layer of the NN is used to produce at least one of a token or a string related to security vulnerabilities of the input samples.

11. The method of claim 1 wherein the altering by gradient change produces an alteration value to be added to the input sample.

12. The method of claim 1 wherein the gradient change is constrained to follow paths which transform input samples classified to a given label to be classified to a respective label according to a mapping between labels.

13. A system for detecting security vulnerabilities, comprising:

at least one processor adapted to execute a code for:

generating a corpus of a plurality of input samples each labeled to indicate a threat level when executed by an input processing code;

training a neural network (NN) using the plurality of input samples to classify inputs according to a plurality of labels of the plurality of input samples;

augmenting the corpus of input samples by, for each input sample:

iteratively alternating between altering the input sample to correspond to a process of gradient change of the NN, and altering the input sample by a fuzzing algorithm until the NN classifies the altered input sample to a classification that is different from a respective label of the input sample before altering;

executing, after the NN classifies the altered input sample to a classification that is different from a respective label of the input sample, the altered input by the input processing code to observe an effect, wherein the input processing code is distinct from the NN; and assigning a new label to the altered input sample based on the observed effect of executing the altered input by the input processing code; and using the plurality of labeled altered input samples to further train the NN.

* * * * *